United States Patent
Zhang et al.

(10) Patent No.: US 11,102,980 B2
(45) Date of Patent: Aug. 31, 2021

(54) METHOD OF PREPARING COPPER-CONTAINING WOOD PRESERVING COMPOSITIONS

(71) Applicant: Koppers Performance Chemicals Inc., Pittsburgh, PA (US)

(72) Inventors: Jun Zhang, Peachtree City, GA (US); Peter Tham, Morrow, GA (US)

(73) Assignee: Koppers Performance Chemicals Inc., Pittsburgh, PA (US)

(*) Notice: Subject to any disclaimer, the term of this patent is extended or adjusted under 35 U.S.C. 154(b) by 139 days.

(21) Appl. No.: 16/114,675

(22) Filed: Aug. 28, 2018

(65) Prior Publication Data
US 2019/0090493 A1 Mar. 28, 2019

Related U.S. Application Data

(60) Provisional application No. 62/553,173, filed on Sep. 1, 2017.

(51) Int. Cl.
| | |
|---|---|
| *A01N 59/20* | (2006.01) |
| *B27K 3/22* | (2006.01) |
| *C09D 7/65* | (2018.01) |
| *C09D 7/63* | (2018.01) |
| *A01N 25/02* | (2006.01) |
| *C09D 5/14* | (2006.01) |

(52) U.S. Cl.
CPC .............. *A01N 59/20* (2013.01); *A01N 25/02* (2013.01); *B27K 3/22* (2013.01); *C09D 5/14* (2013.01); *C09D 7/63* (2018.01); *C09D 7/65* (2018.01)

(58) Field of Classification Search
CPC .......... A01N 25/20; A01N 59/20; C09D 7/00; C09D 5/00; B27K 3/00
See application file for complete search history.

(56) References Cited

U.S. PATENT DOCUMENTS

| 3,637,508 A | 1/1972 | Willsey et al. |
| 7,713,341 B2 * | 5/2010 | Inoue .................... A01N 33/12 |
| | | 106/18.32 |

FOREIGN PATENT DOCUMENTS

| EP | 0058142 A2 | 8/1982 |
| WO | WO-2007053252 A1 | 5/2007 |
| WO | WO-2017112848 A1 | 6/2017 |

OTHER PUBLICATIONS

Notification of Transmittal of the International Search Report and the Written Opinion of the International Searching Authority dated Oct. 29, 2018, issued in PCT/US2018/048263.

* cited by examiner

*Primary Examiner* — Yun Qian
(74) *Attorney, Agent, or Firm* — K&L Gates LLP (57) ABSTRACT

The present invention relates to a method for producing copper ammonia solutions by reacting a cuprous oxide with ammonia, carbon dioxide and an oxidant. The resulting copper-containing solution can then be used to formulate a variety of wood preserving products.

38 Claims, 6 Drawing Sheets

METHOD OF PREPARING COPPER-CONTAINING WOOD PRESERVING COMPOSITIONS

The instant application claims priority to U.S. Provisional Application Ser. No. 62/553,173 filed on Sep. 1, 2017 which is hereby incorporated by reference in its entirety. All patents, printed publications, and references cited herein are hereby incorporated by reference in their entireties.

TECHNICAL FIELD OF INVENTION

The present invention relates to methods of preparing copper-containing aqueous solutions.

BACKGROUND OF THE INVENTION

Wood preserving compositions are well known for preserving wood and other cellulose-based materials, such as paper, particleboard, textiles, rope, etc., against organisms responsible for the destruction of wood, namely fungus and insects. Many conventional wood preserving compositions comprise copper amine complexes. Copper amine complexes have been used in the past because the copper when in such complexes become soluble in aqueous solutions. The copper in such copper amine complexes is obtained from a variety of copper-containing materials, such as copper scrap, cuprous oxide, copper carbonate, copper hydroxide, a variety of cuprous and cupric salts, and copper-containing ores. The amine in such copper amine complexes is normally obtained from an aqueous solution of ammonia and ammonium salts, such as ammonium carbonate, and ammonium sulfate.

U.S. Patent Publication 2007/0207076 described producing metal-containing amine solutions by reacting a metal or metal-containing compound, in particular copper or a copper-containing compound, with an amine, carbon dioxide and an oxidizing agent. The resulting metal-amine solution is disclosed as useful to formulate a variety of metal-based wood preserving products.

Published Canadian Patent Application No. 2,262,186 A1 describes methods for dissolving copper metal comprising circulating an aqueous solution monoethanol amine through a bed of copper metal, and simultaneously passing a source of oxygen through the bed of copper metal; an apparatus for dissolving copper metal comprising a receptacle for containing copper metal, a receptacle for containing an aqueous solution of monoethanolamine, means for pumping the monoethanolamine from the receptacle containing the monoethanolamine to the receptacle containing the copper metal, and pressure means for providing air to the receptacle containing the copper metal; and a process for preserving wood wherein the wood is infiltrated with gaseous carbon disulfide, and impregnated with an aqueous solution of copper ions and dimethylamine.

U.S. Pat. No. 4,622,248 describes forming copper amine complexes by dissolving copper oxide in ammonia in the presence of ammonium bicarbonate.

Some of the first experiments with ammonia and copper-containing ore were carried out at Federal Lead Company, Flat River, Mont., in the early 1900's. The ore was leached by percolation with ammonia and ammonium bicarbonate solutions to form various cupric-ammonium compounds. The copper-ammonia solution was separated from the ore and heated with steam to remove both the ammonia and carbon dioxide and precipitate the copper as cupric oxide. The removed ammonia and carbon dioxide may be collected and recycled.

U.S. Pat. No. 5,492,681 disclose processes to produce cupric oxide dissolving copper-containing materials with aqueous ammonia and an ammonium salt in the presence of oxygen to form a cupric amine compound. Upon heating, the cupric amine compounds decompose to cupric oxide, ammonia and water.

There has been an unmet need for efficient methods of preparing soluble copper complexes suitable for the preparation of wood preservative compositions. The methods of the present invention provide meet this need.

SUMMARY OF THE INVENTION

The present invention provides methods for producing copper-containing solutions. In a preferred embodiment, cuprous oxide ammonia, carbon dioxide and an oxidant are provided, combined to produce an aqueous solution that promotes the dissolution of the copper.

The present invention provides a method for dissolving copper or a copper-containing material comprising the steps of mixing cuprous oxide, water, ammonia, carbon dioxide in an amount less than about 15% by weight, optionally a cationic surfactant, and an oxidant such that the aqueous solution contains between about 5 and about 12% by weight dissolved copper within 5, 3, 2 or 1 hours. In another embodiment, the aqueous solution contains about 6% dissolved copper within 5 minutes, about 6% dissolved copper within 10 minutes, about 8% dissolved copper within 10 minutes, about 8% dissolved copper within 20 minutes, about 10% dissolved copper within 20 minutes, about 10% dissolved copper within 30 minutes, about 10% dissolved copper within 40 minutes, and about 10% dissolved copper within 60 minutes. In another embodiment, the methods of the present invention provide average dissolution rates of between 1 and 20%, 2 and 20%, 3 and 20%, 4 and 20% 5, and 20%, 6 and 20%, 7 and 20%, 8 and 20%, 9 and 20%, 10 and 20%, 11 and 20%, 12 and 20%, 13 and 20%, 14 and 20%, 15 and 20%, 16 and 20%, 17 and 20%, 13 and 20%, 10 and 30%, 11 and 30%, 12 and 30%, 13 and 30%, 14 and 30%, 15 and 30%, 16 and 30%, 17 and 30%, 18 and 30%, 19 and 30%, 20 and 30%, 21 and 10%, 22 and 30%, 23 and 30%, 24 and 30%, and 25 and 30% by weight copper dissolved per hour. In another embodiment, the methods of the present invention provide average dissolution rates of about 1, 2, 3, 4, 5, 6, 7, 8, 9, 0, 11, 12, 13, 14, 15, 6, 17, 18, 19, or 20% by weight copper dissolved per hour. In yet another embodiment, the methods of the present invention provide average dissolution rates of between about 01 and 1% per minute or between about 0.1 and 0.6, 0.2 and 0.6%, 0.3 and 0.6%, 0.4 and 0.1 and 0.2 and 0.5%, or 0.3 and 0.5% by weight copper dissolved per minute. In one embodiment, the term average dissolution rate, as used herein, means the rate over any portion of the reaction. In another embodiment, the average dissolution rate refers to the initial portion of the reaction, for example, between 0-5, 0-10, 0-20, 0-30 or 0-60 minutes.

The present invention also provides a method for dissolving cuprous oxide comprising the steps of mixing the cuprous oxide, water, ammonia, carbon dioxide, optionally a cationic surfactant, and an oxidant such that the aqueous solution contains between about 5 and about 12% by weight dissolved copper within 5, 3, 2 or 1 hours. In another embodiment, the aqueous solution contains about 6% dissolved copper within 5 minutes, about 6% dissolved copper within 10 minutes, about 8% dissolved copper within 10 minutes, about 8% dissolved copper within 20 minutes, about 10% dissolved copper within 20 minutes, about 10% dissolved copper within 30 minutes, about 10% dissolved copper within 40 minutes, and about 10% dissolved copper within 60 minutes. In another embodiment, the methods of the present invention provide average dissolution rates of between 1 and 20%, 2 and 20%, 3 and 20%, 4 and 20% 5, and 20%, 6 and 20%, 7 and 20%, 8 and 20%, 9 and 20%, 10 and 20%, 11 and 20%, 12 and 20%, 13 and 20%, 14 and 20%, 15 and 20%, 16 and 20%, 17 and 20%, 18 and 20%, 10 and 30%, 11 and 30%, 12 and 30%, 13 and 30%, 14 and 30%, 15 and 30%, 16 and 30%, 17 and 30%, 18 and 30%, 19 and 30%, 20 and 30%, 21 and 30%, 22 and 30%, 23 and 30%, 24 and 30%, and 25 and 30% by weight copper dissolved per hour. In another embodiment, the methods of the present invention provide average dissolution rates of about 1, 2, 3, 4, 5, 6, 7, 8, 9, 10, 11, 12, 13, 14, 15, 16, 17, 18, 19, or 20% by weight copper dissolved per hour. In yet another embodiment, the methods of the present invention provide average dissolution rates of between about 0.1 and 1% per minute or between about 0.1 and 0.6%, 0.2 and 0.6%, 0.3 and 0.6%, 0.4 and 0.6%, 0.1 and 0.5%, 0.2 and 0.5%, or 0.3 and 0.5% by weight copper dissolved per minute. In one embodiment, the term average dissolution rate, as used herein, means the rate over any portion of the reaction. In another embodiment, the average dissolution rate refers to the initial portion of the reaction, for example, between 0-5, 0-10, 0-20, 0-30 or 0-60 minutes.

The present invention also provides a method for dissolving cuprous oxide comprising the steps of mixing the cuprous oxide, water, ammonia, and carbon dioxide, optionally a cationic surfactant, and introducing an oxidant to the solution at an air flow rate of between about 0.5 and 100 standard cubic feet per hour (SCFH). In one embodiment, the oxidant is introduced at an air flow rate of between 0.5 and 10, 0.5 and 20, 0.5 and 30, 0.5 and 40, 0.5 and 50, 1 and 5, 1 and 10, 1 and 20, 1 and 30, 1 and 40, 1 and 50, 2 and 10, 2 and 20, 2 and 30, 2 and 40, 2 and 50, 5 and 10, 5 and 20, 5 and 30, 5 and 40, 5 and 50, 10 and 20, 10 and 30, 10 and 40, 10 and 50, 10 and 60, 10 and 70, 10 and 80, 10 and 90, 10 and 100, 20 and 50, 20 and 60, 20 and 70, 20 and 80, 20 and 90, or 20 and 100 SCFH.

The present invention also provides a method for dissolving copper or a copper-containing material comprising the steps of mixing cuprous oxide, water, ammonia, carbon dioxide, an oxidant and a cationic surfactant. In one embodiment, the cationic surfactant is a quaternary ammonium compound. In one embodiment, the quaternary ammonium compound is present in an amount sufficient to produce an average dissolution rate at least 1.5-, 2-, 5-, or 10-fold of that rate observed in the absence of the quaternary ammonium compound. In another embodiment, the surfactant is in a concentration sufficient to produce a copper-amine solution at a rate at least 50% greater than that observed in the absence of the surfactant. In another embodiment, the cationic surfactant is present in an amount sufficient to substantially reduce any solid residue produced during the reaction. In yet another embodiment, the cationic surfactant is present in an amount sufficient to produce substantially no visible residue during the reaction.

The present invention also provides a method for dissolving copper comprising the steps of mixing cuprous oxide, water, between about 5 to 25% by weight ammonia (by weight), carbon dioxide in an amount less than about 15% by weight, an oxidant and a quaternary ammonium compound such that the aqueous solution contains between about 5 and about 12% by weight dissolved copper within 5, 3, 2 or 1 hours. In another embodiment, the aqueous solution contains about 6% dissolved copper within 5 minutes, about 6% dissolved copper within 10 minutes, about 8% dissolved copper within 10 minutes, about 8% dissolved copper within 20 minutes, about 10% dissolved copper within 20 minutes, about 10% dissolved copper within 30 minutes, about 10% dissolved copper within 40 minutes, and about 10% dissolved copper within 60 minutes. In another embodiment, the methods of the present invention provide average dissolution rates of between 1 and 20%, 2 and 20%, 3 and 20%, 4 and 20% 5, and 20%, 6 and 20%, 7 and 20%, 8 and 20%, 9 and 20%, 10 and 20%, 11 and 20%, 12 and 20%, 13 and 20%, 14 and 20%, 15 and 20%, 16 and 20%, 17 and 20%, 18 and 20%, 10 and 30%, 11 and 30%, 12 and 30%, 13 and 30%, 14 and 30%, 15 and 30%, 16 and 30%, 17 and 30%, 18 and 30%, 19 and 30%, 20 and 30%, 21 and 30%, 22 and 30%, 23 and 30%, 24 and 30%, and 25 and 30% by weight copper dissolved per hour. In another embodiment, the methods of the present invention provide average dissolution rates of about 1, 2, 3, 4, 5, 6, 7, 8, 9, 10, 11, 12, 13, 14, 15, 16, 17, 18, 19, or 20% by weight copper dissolved per hour. In yet another embodiment, the methods of the present invention provide average dissolution rates of between about 0.1 and 1% per minute or between about 0.1 and 0.6%, 0.2 and 0.6%, 0.3 and 0.6%, 0.4 and 0.6%, 0.1 and 0.5%, 0.2 and 0.5%, or 0.3 and 0.5% by weight copper dissolved per minute. In one embodiment, the term average dissolution rate, as used herein, means the rate over any portion of the reaction. In another embodiment, the average dissolution rate refers to the initial portion of the reaction, for example, between 0-5, 0-10, 0-20, 0-30 or 0-60 minutes.

The methods of the present invention provide dissolution rates where the aqueous solution contains between about 5 and about 12% by weight dissolved copper within 5, 3, 2 or 1 hours. In another embodiment, the aqueous solution contains about 6% dissolved copper within 5 minutes, about 6% dissolved copper within 10 minutes, about 8% dissolved copper within 10 minutes, about 8% dissolved copper within 20 minutes, about 10% dissolved copper within 20 minutes, about 10% dissolved copper within 30 minutes, about 10% dissolved copper within 40 minutes, and about 10%, dissolved copper within 60 minutes. In another embodiment, the methods of the present invention provide average dissolution rates of between 1 and 20%, 2 and 20%, 3 and 20%, 4 and 20%, and 20%, 6 and 7 and 20%, 8 and 9 and 20%, 10 and 20%, 11 and 20%, 12 and 20%, 13 and 20%, 14 and 20%, 15 and 20%, 16 and 20%, 17 and 20%, 18 and 20%, 10 and 30%, 11 and 30%, 12 and 30%, 14 and 30%, 15 and 30%, 16 and 30%, 17 and 30%, 18 and 30%, 19 and 30%, 20 and 30%, 21 and 30%, 22 and 30%, 23 and 30%, 24 and 30%, and 25 and 30% by weight copper dissolved per hour. In another embodiment, the methods of the present invention provide average dissolution rates of about 1, 2, 3, 4, 5, 6, 7, 8, 9, 10, 11, 12, 13, 14, 15, 16, 17, 18, 19, or 20% by weight copper dissolved per hour. In yet another embodiment, the methods of the present invention provide average dissolution rates of between about 0.1 and 1% per minute or between about 0.1 and 0.6%, 0.2 and 0.6%, 0.3 and 0.6%, 0.4 and 0.6%, 0.1 and 0.5%, 0.2 and 05%, or 0.3 and 0.5%, by weight copper dissolved per minute. In one embodiment, the term average dissolution rate, as used herein, means the rate over any portion of the reaction. In another embodiment, the average dissolution rate refers to the initial portion of the reaction, for example, between 0-5, 0-10, 0-20, 0-30 or 0-60 minutes.

In one embodiment, the carbon dioxide is present in an amount less than about 15%, 10%, 5%, 4%, 3%, 2% or 1% by weight.

In certain embodiments of the invention, the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodide, formate, acetate, propionate, and other alkyl carboxylates. In certain embodiments, the value of m is at least 8 and at most 14, and the value of n is at least 8 and at most 14. In certain embodiments, the value of m is 10 or 12, the value of n is 10 or 12, the value of a is 1, the value of b is 1. In certain embodiments $X^-$ is borate, chloride, propionate, carbonate, or bicarbonate. In certain embodiments, the value of m is 10 and the value of n is 10. In certain embodiments, the value of m is 12 and the value of n is 12.

In certain embodiments of the invention, the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodide, formate, acetate, propionate, acetate, propionate, and other alkyl carboxylates. In certain embodiments, the value of m is at least 8 and at most 14. In certain embodiments, the value of n is at least 8 and at most 14. In certain embodiments, the value of a is 1, the value of b is 1. In certain embodiments $X^-$ is borate, chloride, propionate, carbonate, or bicarbonate. In certain embodiments, the value of m is 10 and the value of n is 10. In certain embodiments, the value of m is 12 and the value of n is 12.

In certain embodiments of the invention, the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodides, formate, acetate, propionate, and other alkyl carboxylates. In certain embodiments, the value of m, n is 10 or 12, the value of a is 1, the value of b is 1, and $X^-$ is borate, chloride, propionate, carbonate, or bicarbonate.

In a more preferred embodiment, the quaternary ammonium compound is n-alkydimethyl benzyl ammonium chloride, alkyldimethylbenzylammonium chloride, alkyldimethylbenzylammonium carbonate/bicarbonate, didecyldimethyl ammonium chloride, didecyldimethyl ammonium carbonate/bicarbonate, didodecyldimethyl ammonium chloride, didodecyldimethyl ammonium carbonate/bicarbonate, coco-bis(2-hydroxyethyl) methylammonium chloride, and didecylmethylpoly(oxyethyl)ammonium propionate.

Each of the methods of the present invention may also be practiced by introducing the oxidant to the solution at a flow rate of between about 0.5 and about 100 standard cubic feet per hour (SCFH). In one embodiment, the oxidant flow rate is between about 0.5 and 5 SCFH. In another embodiment, the oxidant flow rate is between about 0.5 and about 10 SCFH. In yet another embodiment, the oxidant is introduced at an air flow rate of between 0.5 and 10, 0.5 and 20, 0.5 and 30, 0.5 and 40, 0.5 and 50, 1 and 5, 1 and 10, 1 and 20, 1 and 30, 1 and 40, 1 and 50, 2 and 10, 2 and 20, 2 and 30, 2 and 40, 2 and 50, 5 and 10, 5 and 20, 5 and 30, 5 and 40, 5 and 50, 10 and 20, 10 and 30, 10 and 40, 10 and 50, 10 and 60, 10 and 70, 10 and 80, 10 and 90, 10 and 100, 20 and 50, 20 and 60, 20 and 70, 20 and 80, 20 and 90, or 20 and 100 SCFH.

In the methods of the present invention, the cuprous oxide, water, ammonia and the oxidant are mixed in a single reaction chamber. In a preferred embodiment, the single reaction chamber is columnar. In another embodiment, the water, ammonia and the oxidant are mixed in a first reaction chamber and the resulting solution is circulated through copper or a copper-containing material in a second reaction chamber. In one embodiment, carbon dioxide is introduced either in the form of air or as carbon dioxide gas into the solution in the first reaction chamber. Alternatively, carbon dioxide is introduced either in the form of air or as carbon dioxide gas into the solution and cuprous oxide in the second reaction chamber. In yet another embodiment, the methods of the present invention may be practiced by adding the carbon dioxide to the solution, either in the first or second reaction chamber, after addition of the copper.

In the methods of the present invention, the solution contains between about 5 to 25% by weight ammonia. Preferably, the solution contains between about 10 to 20% by weight ammonia. More preferably, the solution contains between about 8 to 15% by weight ammonia.

In the methods of the present invention, the oxidant is oxygen, air, ozone, or hydrogen peroxide.

Each of the methods of the present invention may also be practiced by adding a defoaming agent to the solution. In one embodiment, the defoaming agent is a silicon polymer. In another embodiment, the silicon polymer is polyoxylalkylene silicon.

Each of the methods of the present invention may also be practiced at ambient temperature, for example room temperature, or by heating the solution to between about 20 and about 100° C. Preferably, the temperature is maintained between about 30° and about 80° C. More preferably, the temperature is maintained between about 40° and about 70° C. Most preferably, the temperature is between about 50 and 60° C.

Each of the methods of the present invention may also be practiced by adding an a source of carbon dioxide selected from, for example, carbonic acid, dry ice, ammonium carbonate, ammonium bicarbonate and carbon dioxide. Preferably, carbon dioxide is present in the solution in an amount less than about 15% by weight. In one embodiment, the carbon dioxide is added to the solution prior to addition of the cuprous oxide. In another embodiment, the carbon dioxide is added to the solution after addition of the cuprous oxide. In another embodiment, the carbon dioxide is added to the solution during the addition of the cuprous oxide.

Each of the methods of the present invention may also be practiced by initially adjusting the pH of the solution to between about 9 and 12. Preferably, the pH is initially adjusted to between about 10.5 and about 11.5. In another embodiment, the pH of the solution is maintained between about 10 and 12 by the addition of carbon dioxide. In a preferred embodiment, the pH of the reaction is maintained at about 10.5 and about 11.5. In a more preferred embodiment, the pH of the reaction is maintained about pH 11.

Each of the methods of the present invention may also be practiced by adding a defoaming agent, stirring the solution, circulating the solution or conducting the methods of the present invention at pressure greater than 1 atmosphere.

DETAILED DESCRIPTION OF INVENTION

The present invention provides a method for the production of a dissolved copper ammonia solution that efficiently produces the solution at an expedited rate. For purposes of this application, the copper ammonia solution is obtained by dissolving cuprous oxide that is normally insoluble in water.

Carbon dioxide may be added prior to or after the addition of the cuprous oxide to the composition to adjust the pH of the mixture to about 11.0. However the preferred addition order is prior to the addition of the cuprous oxide. The process can be run without the addition of carbon dioxide; however, the dissolution rate of the copper source is reduced significantly. Sources of carbon dioxide include but are not limited to air, carbon dioxide (g), dry ice (s)(i.e. dry ice), carbonic acid, ammonium carbonate and ammonium bicarbonate.

Any source of oxygen can be used to oxidize copper in this process. Pure oxygen, however, is preferred. Air, ozone, and hydrogen peroxide are also suitable sources of oxygen for use in this process providing standard safety precautions are taken for using oxidants in the presence of organic compounds.

The copper dissolution process could be conducted at ambient pressure. Alternatively the copper dissolution process could be conducted under pressure, such as less than 200 PSI. Preferably, the copper dissolution process could be conducted at pressures less than 100 PSI, less than 50 PSI, Less than 25 PSI and less than 10 PSI.

In certain embodiments of the invention, the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and X is an anion selected from the group consisting of borate, chloride, carbonate, bicarbonate, bromide, iodide, formate, acetate, propionate, and other alkyl carboxylates. In certain embodiments, the value of m is at least 8 and at most 14, and the value of n is at least 8 and at most 14. In certain embodiments, the value of m is 10 or 12, the value of n is 10 or 12, the value of a is 1, the value of b is 1. In certain embodiments X⁻ is borate, chloride, propionate, carbonate, or bicarbonate. In certain embodiments, the value of m is 10 and the value of n is 10. In certain embodiments, the value of m is 12 and the value of n is 12.

In certain embodiments of the invention, the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and X⁻ is an anion selected from the group consisting of borate, chloride, carbonate, bicarbonate, bromide, iodide, formate, acetate, propionate, acetate, propionate, and other alkyl carboxylates. In certain embodiments, the value of m is at least 8 and at most 14. In certain embodiments, the value of n is at least 8 and at most 14. In certain embodiments, the value of a is 1, the value of b is 1. In certain embodiments X⁻ is borate, chloride, propionate, carbonate, or bicarbonate. In certain embodiments, the value of m is 10 and the value of n is 10. In certain embodiments, the value of m is 12 and the value of n is 12.

In certain embodiments of the invention, the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and X⁻ is an anion selected from the group consisting of borate, chloride, carbonate, bicarbonate, bromide, iodides, formate, acetate, propionate, and other alkyl carboxylates. In certain embodiments, the value of m, n is 10 or 12, the value of a is 1, the value of b is 1, and X⁻ is borate, chloride, propionate, carbonate, or bicarbonate.

In a more preferred embodiment, the quaternary ammonium compound is n-alkyldimethyl benzyl ammonium chloride, alkyldimethylbenzylammonium chloride, alkyldimethylbenzylammonium carbonate/bicarbonate, didecyldimethyl ammonium chloride, didecyldimethyl ammonium carbonate/bicarbonate, didodecyldimethyl ammonium chloride, didodecyldimethyl ammonium carbonate/bicarbonate, cocobis(2-hydroxyethyl) methylammonium chloride, and didecylmethylpoly(oxyethyl)ammonium propionate. The resulting dissolved copper solution can be mixed with a variety of biocides such as fungicides and insecticides to produce a formulation suitable for the preservation of wood and other cellulose-base materials. Typical biocides that can be used for this formulation are fungicides such as azoles, quaternary ammonium compounds, and various other conventional insecticides.

Another embodiment of the present invention is a method for preserving and/or waterproofing a wood substrate by contacting a wood substrate with the composition of the present invention. The composition may be applied by any wood treating method known to one of ordinary skill in the art including, but not limited to, brushing, dipping, soaking, vacuum impregnation (e.g. double vacuum technique), and pressure treatment using various cycles.

Modifications and variations of the present invention for a process for the production of aqueous copper amine solutions will be obvious to those skilled in the art from the foregoing detailed description of the invention. Such modifications and variations are intended to come within the scope of the appended claims.

EXAMPLES

The following Examples serve to further illustrate the present invention and are not to be construed as limiting its scope in any way.

Example 1

A solution mixture of 771.4 g of water and 862.0 g of aqueous ammonium hydroxide solution containing 29% ammonia was added to a beaker. The solution was mixed while a glass frit connected to a $CO_2$ tank was submerged in the beaker and sparged into the solution. After the sparging of $CO_2$ was complete, a charge of 181.8 g of cuprous oxide powder was added to the beaker while mixing. A separate glass frit connected to an oxygen line was submerged into the solution. Oxygen was then sparged into the solution while mixing. Solution samples were periodically taken during the reaction process to measure the copper content of the solution. After 3 hours of sparging oxygen into the solution, a solution sample was taken and analyzed for Cu. The Cu was found to be low, about 4.0%, so more oxygen was sparged into the solution to try to react the rest of the cuprous oxide. The reaction was continued for about 9 hours and the Cu content was analyzed at approximately 4.5% which was still much lower than the theoretical value of 8.0%. It was apparent much of the cuprous oxide was unreacted due to the excess buildup of material on the walls of the beaker as well as solid material present in the beaker.

Example 2

A solution mixture of 771.4 g of water and 862.0 g of aqueous ammonium hydroxide solution, containing 29% ammonia was added to a beaker. The solution was mixed while a glass frit connected to a $CO_2$ tank was submerged in the beaker and sparged into the solution. Approximately 120.0 g of $CO_2$ was initially added to the solution, with the remaining 40.0 g left out to be added after the reaction is complete for pH adjustment. The temperature of the solution after the addition of $CO_2$ was at about 50° C. Before the addition of cuprous oxide, 2.65 g of antifoam and 1.0 g of alkyldimethylbenzyl ammonium chloride (ADBAC) was added to the solution while mixing. Approximately 181.8 g of cuprous oxide powder was added to the solution while mixing. Immediately after the addition of cuprous oxide, a glass frit connected to an oxygen line was submerged into the solution. The sparging of oxygen was initiated and was continued for a total of 3 hours. During the reaction, the temperature was measured at about 60° C. Solution samples were periodically taken during the reaction process to measure the copper content of the solution. After the reaction was complete at 3 hours, the glass frit connected to the $CO_2$ tank was re-submerged in the solution and a final 38.0 g of $CO_2$ was added.

Figure 1:
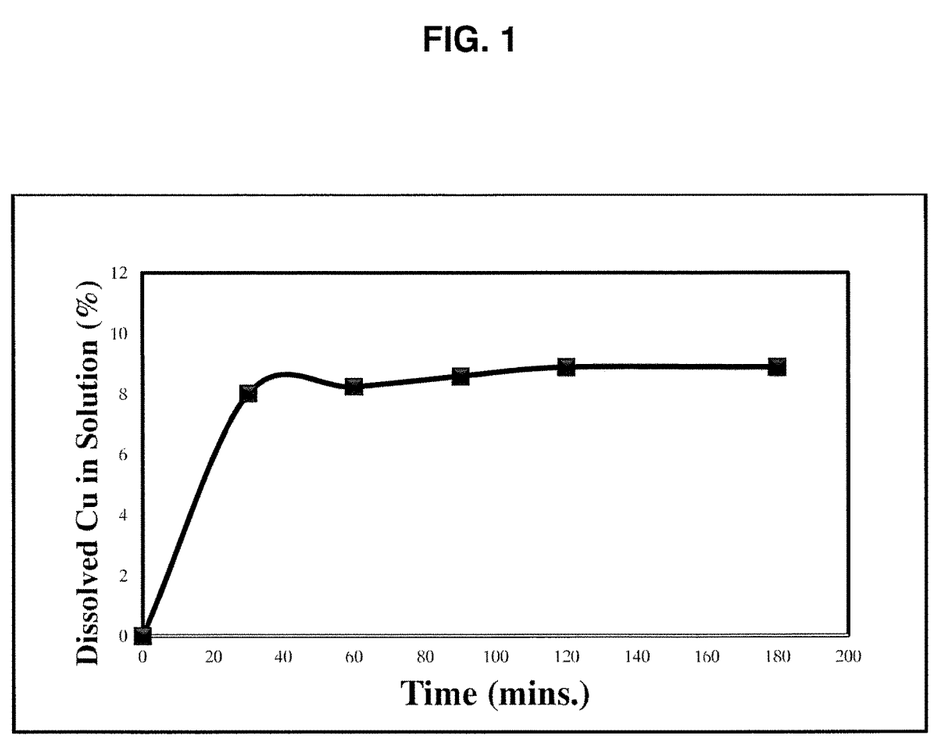
FIG. 1. Production of copper ammonium carbonate according to Example 2.

The final Cu concentration was analyzed at about 8.31% and the reaction ran much smoother than the previous batch with no residue left on the wall of the beaker. A graph depicting the copper results throughout the reaction are shown in the appendix as FIG. 1.

Example 3

A solution mixture of 465.2 g of water and 1077.6 g of aqueous ammonium hydroxide solution, containing 29% ammonia, was added to a beaker. The solution was mixed while a glass frit connected to a $CO_2$ tank was submerged in the beaker and sparged into the solution. Approximately 190.0 g of $CO_2$ was then added to the solution while mixing. The temperature of the solution after the addition of $CO_2$ was at about 60° C. Before the addition of cuprous oxide, 2.50 g of antifoam and 1.22 g of alkyldimethylbenzyl ammonium chloride was added to the solution mixing. Immediately after the addition of cuprous oxide, a glass frit connected to an oxygen line was submerged into the solution. The sparging of oxygen was initiated and was continued for approximately 3 hours. About 90 minutes into the reaction, a large amount of foam began to form in the beaker, so an additional 0.50 g of antifoam was added to the solution while mixing. Solution samples were periodically taken during the reaction process to measure the copper content of the solution.

Figure 2:
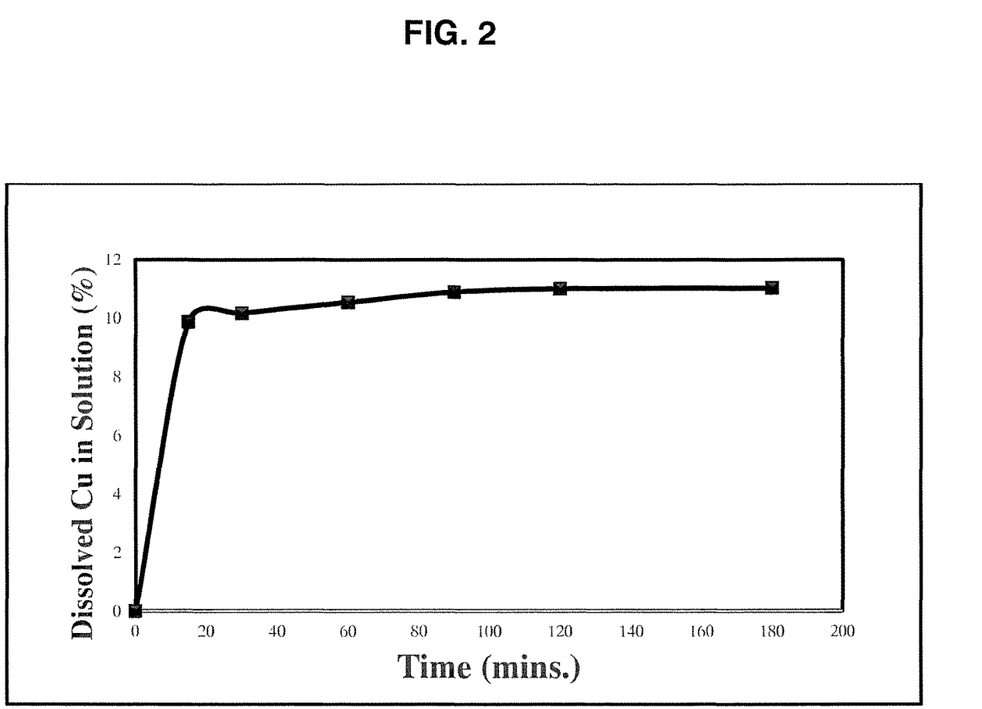
FIG. 2. Production of copper ammonium carbonate according to Example 3.

The final Cu concentration was analyzed at about 10.24%. A graph depicting the copper results throughout the reaction are shown in the appendix as FIG. 2.

Example 4

A solution mixture of 771.4 g of water and 862.0 g of aqueous ammonium hydroxide solution, containing 29% ammonia, was added to a beaker. The solution was mixed while a glass frit connected to a $CO_2$ tank was submerged in the beaker and sparged into the solution. Approximately 130.0 g of $CO_2$ was initially added to the solution, with the remaining 31.0 g left out to be added after the reaction is complete for pH adjustment. Before the addition of cuprous oxide, 2.10 g of antifoam and 1.5 g of cocobis(2-hydroxyethyl) methylammonium chloride was added to the solution while mixing. Approximately 181.8 g of cuprous oxide powder was added to the solution while mixing. Immediately after the addition of cuprous oxide, a glass frit connected to an oxygen line was submerged into the solution. The sparging of oxygen was initiated and was continued for approximately 3 hours. Solution samples were periodically taken during the reaction process to measure the copper content of the solution. After the reaction was complete at 3 hours, the glass frit connected to the $CO_2$ tank was re-submerged in the solution and a final 30.0 g of $CO_2$ was added.

Figure 3:
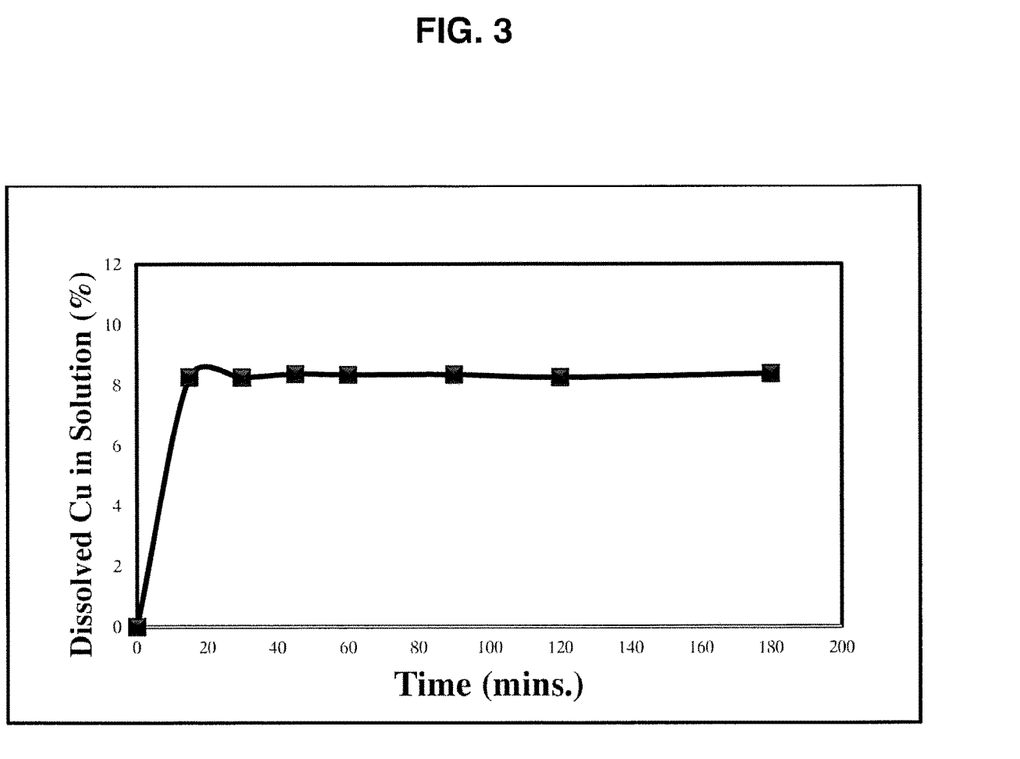
FIG. 3. Production of copper ammonium carbonate according to Example 4.

The final Cu concentration was analyzed at about 8.14%. A graph depicting the copper results throughout the reaction are shown in the appendix as FIG. 3.

Example 5

A solution mixture of 612.8 g of water and 958.0 g of aqueous ammonium hydroxide solution, containing 29% ammonia, was added to a beaker. The solution was mixed while a glass frit connected to a $CO_2$ tank was submerged in the beaker and sparged into the solution. Approximately 140.0 g of $CO_2$ was initially added to the solution, with the remaining 30.0 g left out to be added after the reaction is complete for pH adjustment. Before the addition of cuprous oxide, 3.20 g of antifoam and 1.6 g of cocobis(2-hydroxyethyl) methylammonium chloride was added to the solution while mixing. Approximately 229.4 g of cuprous oxide was added to the solution while mixing. Immediately after the addition of cuprous oxide, a glass frit connected to an oxygen line was submerged into the solution. The sparging of oxygen was initiated and was continued for approximately 3 hours. Solution samples were periodically taken during the reaction process to measure the copper content of the solution. After the reaction was complete at 3 hours, the glass frit connected to the $CO_2$ tank was re-submerged in the solution and a final 30.0 g of $CO_2$ was added.

Figure 4:
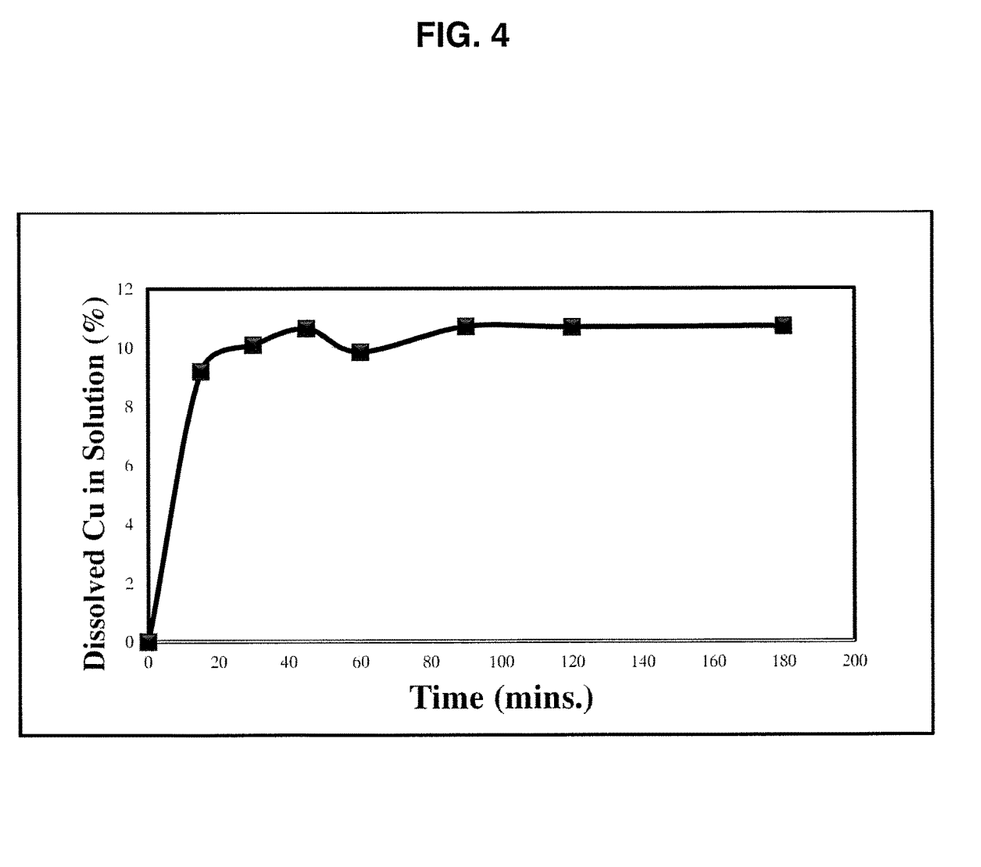
FIG. 4. Production of copper ammonium carbonate according to Example 5.

The final Cu concentration was analyzed at about 9.23%. A graph depicting the copper results throughout the reaction are shown in the appendix as FIG. 4. After a few days of static stability, a large chuck of solid formed on the bottom of the jug.

Example 6

A solution mixture of 846.56 g of water, with the remaining 164.56 g left out for final re-adjustment, and 958.0 g of aqueous ammonium hydroxide solution, containing 29% ammonia, was added to a beaker. The solution was mixed while a glass frit connected to a $CO_2$ tank was submerged in the beaker and sparged into the solution. Approximately 150.0 g of $CO_2$ was added to the solution, with the remaining 130.0 g left out to be added after the reaction is complete for pH adjustment. Before the addition of cuprous oxide, 3.27 g of antifoam and 2.84 g of cocobis(2-hydroxyethyl) methylammonium chloride was added to the solution while mixing. Approximately 378.6 g of cuprous oxide was added to the solution while mixing. Immediately after the addition of cuprous oxide, a glass fit connected to an oxygen line was submerged into the solution. The sparging of oxygen was initiated and was continued for approximately 3 hours. About 60 minutes into the reaction, some foam began to form in the beaker, so an additional 1.72 g of antifoam was added to the solution while mixing. Solution samples were periodically taken during the reaction process to measure the copper content of the solution.

Figure 5:
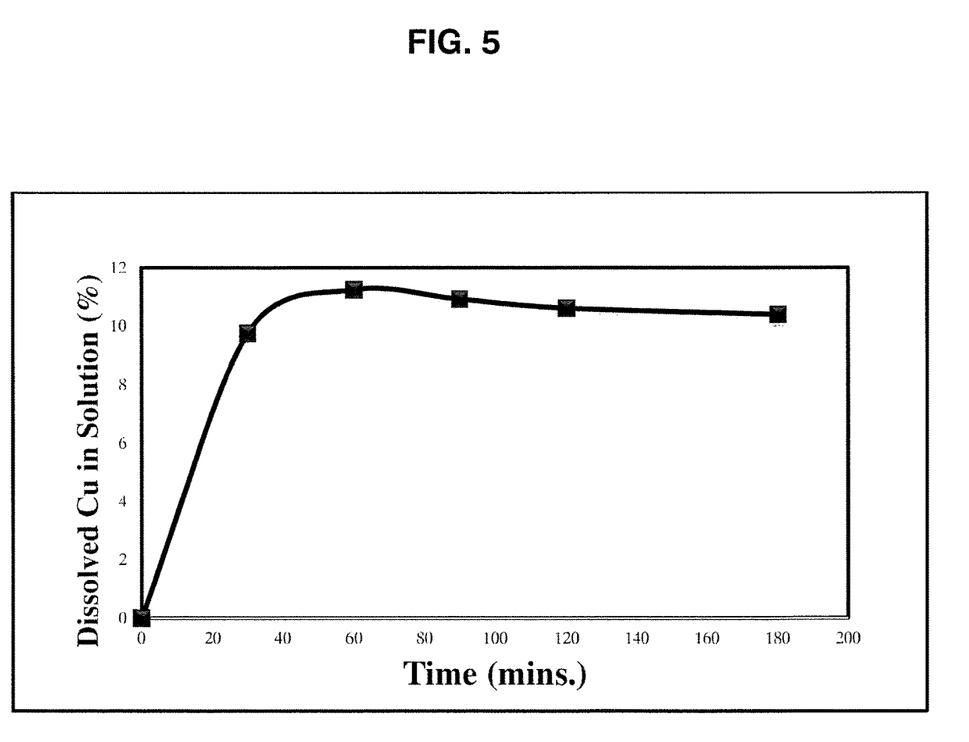
FIG. 5. Production of copper ammonium carbonate according to Example 6.

The final Cu concentration was analyzed at about 10.41%. A graph depicting the copper results throughout the reaction are shown in the appendix as FIG. 5. After a few days of static stability, a large chuck of solid formed on the bottom of the jug.

Example 7

A solution mixture of 682.8 g of water and 960.8 g of aqueous ammonium hydroxide solution, containing 29% ammonia, was added to a beaker. The solution was mixed while a glass frit connected to a $CO_2$ tank was submerged in the beaker and sparged into the solution. Approximately 105.0 g of $CO_2$ was then added to the solution while mixing. Before the addition of cuprous oxide, 2.6 g of antifoam and 1.6 g of cocobis(2-hydroxyethyl) methylammonium chloride was added to the solution while mixing. Approximately 229.4 g of cuprous oxide was added to the solution while mixing. Immediately after the addition of cuprous oxide, a glass frit connected to an oxygen line was submerged into the solution. The sparging of oxygen was initiated and was continued for approximately 3 hours. About 20 minutes into the reaction, some foam began to form in the beaker, so an additional 0.4 g of antifoam was added to the solution while mixing. Solution samples were periodically taken during the reaction process to measure the copper content of the solution.

Figure 6:
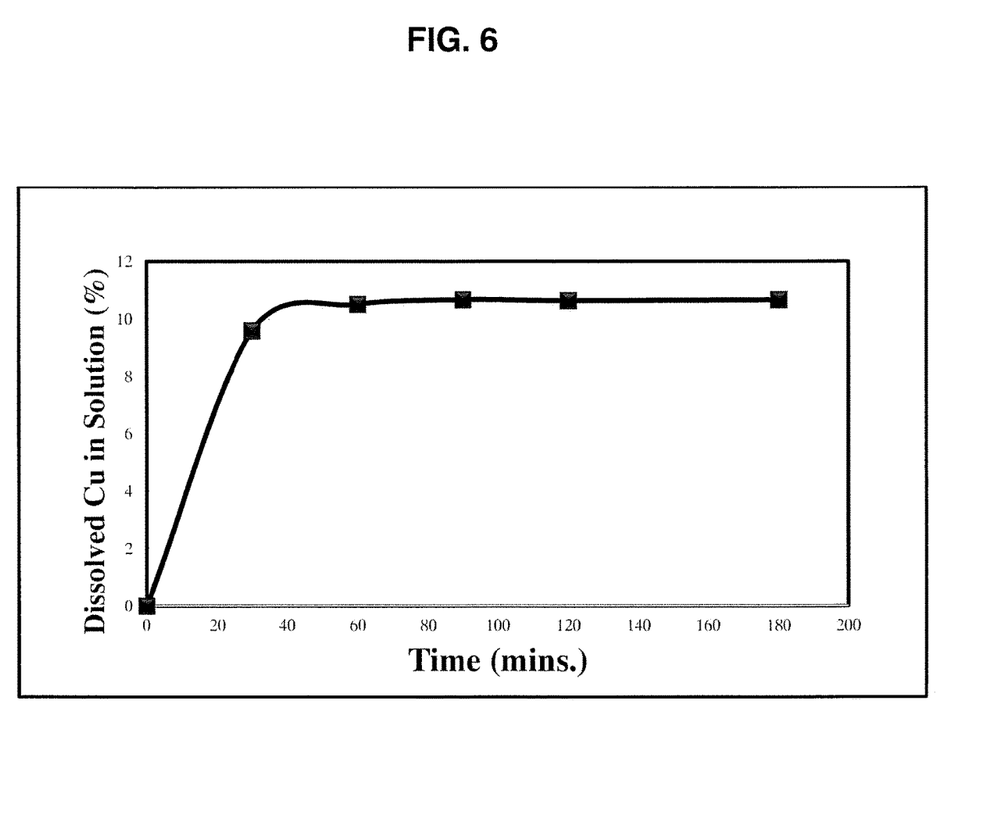
FIG. 6. Production of copper ammonium carbonate according to Example 7.

The final Cu concentration was analyzed at about 10.66%. A graph depicting the copper results throughout the reaction are shown in the appendix as FIG. 6. No solid formation appeared in the jug after a few days of static stability.

We claim:
1. A method for dissolving cuprous oxide comprising: producing a reaction by mixing cuprous oxide, water, 5 to 25% by weight ammonia based on the total weight of an aqueous solution, carbon dioxide in an amount less than 15% by weight based on the total weight of the aqueous solution, an oxidant and a cationic surfactant to form the aqueous solution such that the aqueous solution contains between 5 and 12% dissolved copper within 5 hours based on the total weight of the aqueous solution,
wherein the cationic surfactant comprises a quaternary ammonium compound having a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodide, formate, acetate, propionate, and other alkyl carboxylates.

2. The method of claim 1, wherein carbon dioxide is provided in a form of carbon dioxide, dry ice, carbonic acid, ammonium carbonate or ammonium bicarbonate.

3. The method of claim 1, wherein the aqueous solution contains between 5 and 12% dissolved copper within 3 hours.

4. The method of claim 1, wherein the aqueous solution contains between 5 and 12% dissolved copper within 1 hour.

5. The method of claim 1, wherein the quaternary ammonium compound has a chemical structure comprising:

wherein the value of in is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodide, formate, acetate, propionate, and other alkyl carboxylates.

6. The method of claim 1, wherein the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodide, formate, acetate, propionate, and other alkyl carboxylates.

7. The method of claim 1, wherein the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodides, formate, acetate, propionate, and other alkyl carboxylates.

8. The method of claim 1, wherein the quaternary ammonium compound is n-alkydimethyl benzyl ammonium chloride, alkyldimethylbenzylammonium chloride, alkyldimethylbenzylammonium carbonate/bicarbonate, didecyldimethyl ammonium chloride, didecyldimethyl ammonium carbonate/bicarbonate, didodecyldimethyl ammonium chloride, didodecyldimethyl ammonium carbonate/bicarbonate, coco-bis(2-hydroxyethyl) methylammonium chloride, or didecylmethylpoly(oxyethyl)ammonium propionate.

9. The method of claim 1, wherein the quaternary ammonium compound is ($C_{12}$-$C_{18}$) dimethylbenzylammonium chloride.

10. The method of claim 1, wherein the mixing comprises introducing the oxidant to the solution at a flow rate of between 0.5 and 100 standard cubic feet per hour (SCFH).

11. The method of claim 10, wherein the oxidant flow rate is between 0.5 and 5 SCFH.

12. The method of claim 10, wherein the aqueous solution contains between 5 and 12% dissolved copper within 5 hours.

13. The method of claim 10, wherein the aqueous solution contains between 5 and 12% dissolved copper within 3 hours.

14. The method of claim 10, wherein the aqueous solution contains between 5 and 12% dissolved copper within 1 hour.

15. The method of claim 10, wherein said reaction is maintained between 20° C. to 95° C.

16. The method of claim 1, wherein the cationic surfactant is an amount sufficient to produce an average dissolution rate at least twice that observed in the absence of the cationic surfactant.

17. The method of claim 16, wherein the solution contains between 5 and 12% dissolved copper within 5 hours.

18. The method of claim 16, wherein the aqueous solution contains between 5 and 12% dissolved copper within 3 hours.

19. The method of claim 16, wherein the aqueous solution contains between 5 and 12% dissolved copper within 1 hour.

20. The method of claim 16, wherein the cationic surfactant is present in an amount between 0.125 and 0.250% by weight.

21. The method of claim 16, wherein the cuprous oxide, the water, the ammonia, the oxidant and the cationic surfactant are mixed in a single reaction chamber.

22. The method of claim 16, wherein the cationic surfactant is in a concentration sufficient to produce a copper solution at an average dissolution rate at least 5-fold that observed in the absence of the cationic surfactant.

23. The method of claim 16, wherein the cationic surfactant is in a concentration sufficient to produce a copper solution at an average dissolution rate at least 10-fold that observed in the absence of the cationic surfactant.

24. The method of claim 16, wherein the cationic surfactant is in a concentration sufficient to produce a copper solution at an average dissolution rate at least 50% greater than that observed in the absence of the cationic surfactant.

25. The method of claim 16, wherein the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodide, formate, acetate, propionate, and other alkyl carboxylates.

26. The method of claim 16, wherein the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodide, formate, acetate, propionate, and other alkyl carboxylates.

27. The method of claim 16, wherein the quaternary ammonium compound has a chemical structure comprising:

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodides, formate, acetate, propionate, and other alkyl carboxylates.

28. The method of claim 16, wherein the quaternary ammonium compound is n-alkydimethyl benzyl ammonium chloride, alkyldimethylbenzylammonium chloride, alkyldimethylbenzylammonium carbonate/bicarbonate, didecyldimethyl ammonium chloride, didecyldimethyl ammonium carbonate/bicarbonate, didodecyldimethyl ammonium chloride, didodecyldimethyl ammonium carbonate/bicarbonate, cocobis(2-hydroxyethyl) methylammonium chloride, or didecylmethylpoly(oxyethyl)ammonium propionate.

29. The method of claim 16, wherein the quaternary ammonium compound is $(C_{12}\text{-}C_{18})$ dimethylbenzylammonium chloride.

30. The method of claim 16, wherein the quaternary ammonium compound is low foaming.

31. The method of claim 16, wherein said reaction is maintained between 20° C. to 95° C.

32. The method of claim 1 further comprising a defoaming agent.

33. The method of claim 32, wherein the defoaming agent is a silicon polymer.

34. The method of claim 33, wherein the silicon polymer is polyoxylalkylene silicon.

35. The method of claim 1, wherein the cationic surfactant is a low-foaming surfactant.

36. The method of claim 1, wherein the oxidant is oxygen, air, ozone, or hydrogen peroxide.

37. The method of claim 1, wherein said reaction is maintained between 20° C. to 95° C.

38. The method of claim 1, wherein the value of m and n is 10 or 12, the value of a is 1, the value of b is 1, and $X^-$ is borate, chloride, propionate, carbonate, or bicarbonate.

* * * * *